Sept. 9, 1958
E. L. WOLF
2,851,637
DECIMAL COUNTING CHAIN, NON-EXTINGUISHING
Filed March 4, 1957
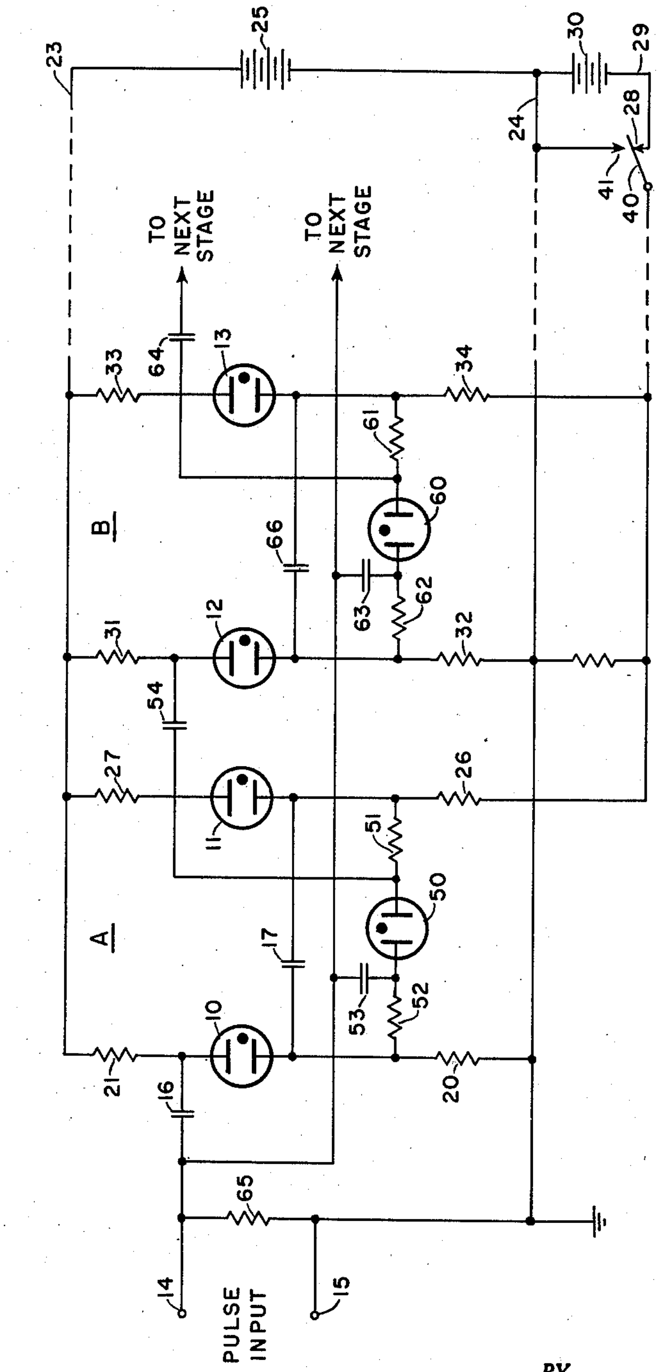
INVENTOR.
EDWARD L. WOLF
BY Francis E. Blake
ATTORNEY United States Patent Office 2,851,637
Patented Sept. 9, 1958

2,851,637

DECIMAL COUNTING CHAIN, NON-EXTINGUISHING

Edward L. Wolf, Fairport, N. Y., assignor to General Dynamics Corporation, Rochester, N. Y., a corporation of Delaware Application March 4, 1957, Serial No. 643,641

3 Claims. (Cl. 315—84.5)

The present invention relates to pulse counting circuits and, more particularly, to so-called decimal pulse counting chains.

Voltage pulse counting circuits are widely used in electronic computer systems and the like. They are also used for laboratory analysis and for radiation measurement. Constant research is being undertaken to simplify improved pulse counting circuits.

The object of this invention is to provide an improved pulse counting circuit using simple and reliable, inexpensive components to enable reliable operation.

Another object of the invention is to provide an improved decimal pulse counting chain having a plurality of decimal registration stages, each arranged to be non-extinguishing upon the registration and counting of successive pulses.

Yet another object of the invention is to provide a new and improved counting chain of the decimal type having simple and reliable means for coupling the pulses to be counted to successive registration stages as each pulse is counted and registered.

Various other objects and features and the attending advantages will become apparent with reference to the following specification and drawing in which the sole figure is a schematic wiring diagram.

Referring to the drawing, a two-stage decimal counting chain is shown although it should be understood that any number of stages could be connected in tandem to provide the desired decimal counting capacity. Each stage is comprised of a mono-stable two-state circuit, such as stage A, having gaseous discharge tubes 10, 11, and stage B having gaseous discharge tubes 12, 13. Each of the gaseous discharge devices 10–13 may preferably be a neon tube of the type designated NE–96. NE–96 diodes are constant current devices having characteristics which require a direct current potential of approximately at least one hundred and twenty-five volts thereacross to initiate conduction, but which will sustain conduction with a direct current potential thereacross having a minimum value of approximately sixty-five to seventy volts. Since each stage A, B, etc., is identical, only one stage will be described in detail.

Referring now to stage A, the circuit is arranged, as will be described in detail, to provide an unstable state when tube 11 is conducting and a stable state when tube 10 is conducting. In other words, the application of the voltage pulse to be counted across the input terminals 14 and 15 to be coupled by capacitor 16 to the diode 10, causes that diode to become conductive when diode 11 had been previously conducting and, through the action of the capacitor 17, causes diode 11 to be extinguished. Thereafter, with the circuit as described, continued application of voltage pulses across the input terminals 14 and 15 will not change the states of conduction of diodes 10 and 11 with diode 10 conductive and diode 11 extinguished.

Diode 10 is connected in series with resistors 20 and 21 across terminals 23 and 24 of a battery power supply source, indicated at 25, and the amount of potential normally applied across the electrodes of diode 10 by the battery 25 is less than the firing voltage characteristic for the diode 10 but higher than its sustaining voltage characteristic. On the other hand, diode 11 may be connected in series with resistors 26 and 27 and closed contacts 28 of single-pole double-throw switch 40 to terminals 23 and 29 of the power supply including batteries 25 and 30. The additional voltage applied by the battery 30 through the closed contacts 28 of switch 40 provides a potential across the diode 11 which is greater than its firing voltage characteristic so that tube 11 may be initially primed "on."

The neon tubes 12, 13 of stage B are similarly connected through resistors 31, 32, 33 and 34 so that neon tube 13 may also be primed "on" when switch 40 is momentarily operated with switch contacts 28 closed before any pulses to be registered are applied.

As briefly mentioned above, switch 40 may be momentarily operated to close contacts 28 in order to prime "on" the tubes 11 and 13. When it is desired to count the voltage pulses across pulse input terminals 14 and 15, switch 40 is operated in a manner to open contacts 28 and close contacts 41, which lowers the voltage across diodes 11 and 13 to lower than their firing voltage characteristic but higher than their sustaining voltage characteristic, so that tubes 11 and 13 remain conductive. Thereafter, the first voltage pulse to be counted as applied across terminals 14 and 15 will be coupled by capacitor 16 to be applied to gas tube 10, momentarily raising the voltage across gas tube 10 to exceed its firing voltage amplitude characteristic to cause gas tube 10 to become conductive. Gas tube 10 remains conductive since after the decay of the voltage pulse to be counted, the potential normally applied through resistors 20 and 21 is greater than the sustaining voltage amplitude characteristic for tube 10. On the other hand, the negative pulse coupled by capacitor 17, which is produced upon decay of the voltage pulse to be registered, momentarily lowers the voltage across the then conducting tube 11 to less than its sustaining voltage characteristic, thus extinguishing tube 11. Thereafter, successive voltage pulses to be registered as applied across input terminals 14 and 15 will have no further effect since gas tube diode 10, which is a constant current device, is conducting and gas tube 11 is extinguished and the operation of the mono-stable stage A from its unstable state to its stable state is thereby accomplished by the first applied voltage pulse to be counted.

Connected to the first stage 10 is a coupling device, or tube 50, which also may be a constant current gaseous discharge device of the NE–96 type. While gas tube 11 is conducting and gas tube 10 is non-conducting, the right-hand electrode of coupling tube 50 will be at a positive potential and the left-hand electrode of such tube will be at ground potential as connected through resistors 51 and 52, respectively. This establishes a first state or polarity of conduction condition for the coupling tube 50. On the other hand, when gas tube 10 is conducting and gas tube 11 is non-conducting during the stable condition of the bi-stable circuit A, the left-hand electrode of diode 50 will be at a positive potential and the right-hand electrode of such tube will be at negative or ground potential. Thus, a second state or polarity of conduction of the coupling tube 50 is established when the mono-stable stage A is in its stable state. The voltage pulses to be counted and registered as applied across terminals 14 and 15 are of such polarity as to be coupled by capacitor 53 in series with the coupling tube 50 and capacitor 54 to the diode 12 of stage B when the coupling tube 50 is in the state of polarity of conduction corresponding to the stable condition of the first mono-stable stage A.

Thus, the second voltage pulse to be counted will be coupled through capacitor 53, coupling tube 50, and capacitor 54 to the second decimal stage B to change such mono-stable stage from the unstable state to the stable state with tube 12 conducting and tube 13 extinguished. This change of the second stage to its stable state causes coupling tube 60 to be changed to the state of polarity of conduction such that the third pulse to be counted or registered will be coupled through coupling capacitor 63, coupling tube 60, and capacitor 64 to the next mono-stable registration stage, not shown.

Assuming a battery potential for battery 25 of about one hundred volts, and a battery potential for battery 30 of twenty-five volts, and employing neon diode tubes of the type NE–96 for tubes 10–13, 50 and 60, the following table of values may be given for one practical application of the invention:

| | | |
|---|---|---|
| Resistors **21, 27, 31, 33, 65** | ohms | 10,000 |
| Resistors **20, 26, 32, 34** | do | 200,000 |
| Resistors **51, 52, 61, 63** | do | 1,000,000 |
| All capacitors | mf | .005 |

While there has been shown and described a preferred embodiment of the invention in which the operation of the gate tube 50 or 60 is suitably poled for conducting a certain polarity of pulses to be counted to successive decimal counting stages, it should be understood that many variations will occur to those skilled in the art such as, for example, arranging the gate 50 or 60 to become conductive or non-conductive, respectively, by differences in applied voltage for the different states of condition of the associated mono-stable decimal registration circuit.

What is claimed is:

1. A pulse counting chain comprising, a plurality of two-state circuits each having an unstable state and a stable state, means for initially setting said circuits to their unstable states, pulse input terminals, means for connecting said terminals to a first one of said circuits in a manner to cause said first circuit to change to the stable state upon application to said terminals of the first voltage pulse to be counted, a coupling gate having conductive and non-conductive states and connected in said first circuit to be in the non-conductive state when said first circuit is in its unstable state and to be in the conductive state when said first circuit is in its stable state, and means for connecting said input terminals in series with said coupling gate and a second one of said two-state circuits in a manner to cause said second circuit to change to the stable state upon application to said terminals of a second voltage pulse to be counted.

2. A pulse counting chain comprising, a plurality of two-state circuits each having an unstable state and a stable state, means for initially setting said circuits to their unstable states, pulse input terminals, means for connecting said terminals to a first one of said circuits in a manner to cause said first circuit to change to the stable state upon application to said terminals of a certain polarity of first voltage pulse to be counted, a coupling gate having conductive and non-conductive states and connected in said first circuit to be in the non-conductive state when said first circuit is in its unstable state and to be in the conductive state with a certain polarity when said first circuit is in its stable state, and means for connecting said input terminals in series with said coupling gate and a second one of said two-state circuits in a manner to cause said second circuit to change to the stable state upon application to said terminals of a certain polarity of second voltage pulse to be counted.

3. The invention of claim 2 in which said coupling gate is comprised of a gaseous discharge device having at least two electrodes and a minimum amplitude voltage characteristic for initiating a discharge, and means connecting said device in said first circuit to apply a voltage across said device that is poled with a certain polarity only when said first circuit is in the stable state.

No references cited.